United States Patent [19]

Forster

[11] Patent Number: 4,815,863

[45] Date of Patent: Mar. 28, 1989

[54] JOURNAL

[75] Inventor: Gervase L. Forster, Jordans, England

[73] Assignee: Hepco Slide Systems Limited, Middlesex, England

[21] Appl. No.: 169,940

[22] Filed: Mar. 18, 1988

[30] Foreign Application Priority Data

Mar. 26, 1987 [GB] United Kingdom ............... 8707246

[51] Int. Cl.⁴ .................... F16C 19/02; F16C 29/04
[52] U.S. Cl. .................................. 384/49; 384/58; 384/537; 384/542
[58] Field of Search ............... 384/49, 58, 542, 577, 384/585, 540, 537, 255

[56] References Cited

U.S. PATENT DOCUMENTS

| 425,694 | 4/1890 | Porter et al. | 384/585 |
| 2,596,771 | 5/1952 | Harbour | 384/542 |
| 4,109,343 | 8/1978 | Weis et al. | 384/542 |
| 4,602,876 | 7/1986 | Miki et al. | 384/585 |

Primary Examiner—Lenard A. Footland
Attorney, Agent, or Firm—Flynn, Thiel, Boutell & Tanis

[57] ABSTRACT

A journal for a bearing of a precision slide system comprising a support having a blind bore with connecting means in the form of a screw or bolt adapted to secure the support in the journal having a head of complementary shape to a rebate of the journal, and means to bind the journal and screw or bolt together. The blind bore has a rebate therein and the screw or bolt is adapted to be accommodated in the rebate and adapted to connect the bearing and support whereby there is a substantially flush surface across the support and connecting means.

The bore has a female thread and the rebate has a frusto-conical shape, and is carried by a ball race of the journal, which ball race is mounted on a second one (FIG. 1), which in turn rests on a nut, the support passing through the nut to be secured to a base or machine plate (FIG. 5). The bearing is formed of two vertically (as shown) mounted wheels which form a 70° V-groove for receiving the edge of a slide of the system.

13 Claims, 2 Drawing Sheets

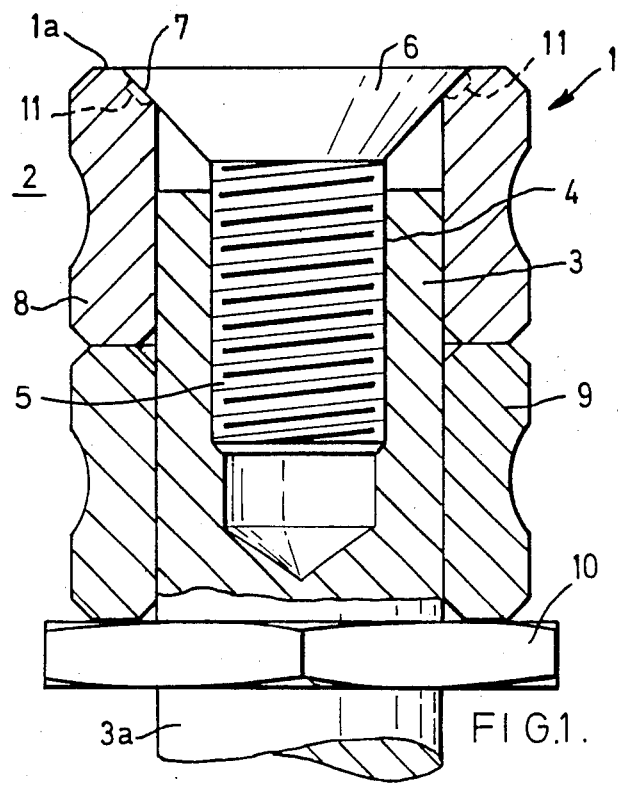
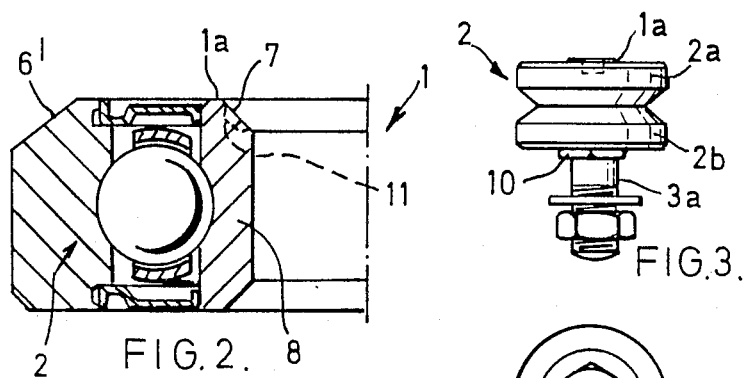
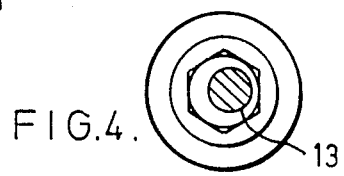

JOURNAL

The invention relates to a journal, particularly a journal of the kind used to mount a bearing in a precision slide system.

Such bearings are usually mounted on a bed or machine plate by their journals, which pass through the plate and are secured to it, the journals being secured at the opposite end by a proud extension and nut arrangement. This is a disadvantage insofar as operatives can injure themselves and that more space is required than would otherwise be the case. Moreover, some of the bearings are eccentric, and are adjusted to take up slack in the system and such adjustment is effected by applying torque to the journal. Such torque can be unevenly applied resulting in misalignment.

It is an object of the invention to seek to obviate these disadvantages.

According to the invention there is provided a journal for a bearing, comprising a support for the bearing having a blind bore with a rebate therein, and means adapted to be accommodated in the rebate and adapted to connect the bearing and support whereby there is a substantially flush surface across the support and connecting means.

The support and connecting means may have a frusto-conical configuration. This provides for ease of connection.

The connecting means may comprise a screw, which is readily manipulable for ease of assembly.

The rebate of the support and the connecting means may be of complementary shape.

The rebate and a head of the connecting means may have respective angles of inclination, which angles are unequal. This construction ensures connection whilst obviating bottoming of the screw on the inclined face of the rebate which might otherwise result in binding on metal-to-metal contact.

The connection means may be eccentrically mounted. This provides for shifting of the bearing to adjust its position.

The support may be longer than the depth of the bearing. This construction enables the bearing to be mounted on a machine bed or plate from below.

There may be means adapted to bind the support and connecting means together.

The binding means may comprise an adhesive compound.

There may be a surface profile in which the binding means can be received. This provides for ease of application of the binding means.

The profile may comprise a continuous groove in the surface of the rebate of the support.

According to a further aspect of the invention there is provided a bearing including a journal therefor substantially as hereinbefore defined.

According to a yet further aspect, the invention provides a slide system including a bearing as hereinbefore defined.

Journals, a bearing and a slide system embodying the invention are hereinafter described, by way of example, with reference to the accompanying drawings.

FIG. 1 is a longitudinal sectional view of a journal according to the invention;

FIG. 2 is to a smaller scale, a longitudinal section through a bearing according to the invention;

FIG. 3 is a side elevational view to a smaller scale of the bearing of FIG. 2;

FIG. 4 is a plan view of the bearing of FIG. 3;

Figure 5:
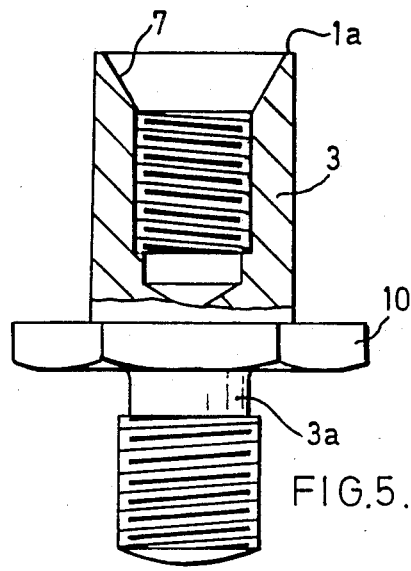
FIG. 5 is an enlarged view of a support of the journal.

Referring to the drawings, in which like parts are identified by like reference numerals, there is shown a journal 1, for a bearing 2 comprising a support 3 having a blind bore 4 with connecting means in the form of a screw or bolt 5 adapted to secure the support 3 in the journal 1 having a head 6 of complementary shape to a rebate 7 of the journal 1, and means to bind the journal 1 and screw or bolt 5 together. The blind bore 4 has a rebate therein and the screw or bolt 5 is adapted to be accommodated in the rebate and adapted to connect the bearing 2 and support whereby there is a substantially flush surface 1a across the support and connecting means.

The bore 4 has a female thread and the rebate 7 has a frusto-conical shape, and is carried by a ball race 8 of the journal 1, which ball race 8 is mounted on a second one 9 (FIG. 1), which in turn rests on a nut 10, the support 3 passing through the nut 10 to be secured to a base or machine plate 12 (FIG. 5).

The bearing 2 is formed of two vertically (as shown) mounted wheels 2a, 2b which form a 70° V-groove for receiving the edge of a slide 2c of the system.

The race 8 and screw 5 are secured rigidly together by means of an adhesive compound such as Loktite so that they are effectively one unit.

In a modification, shown in dashed lines 11 (FIGS. 1 and 2), the rebate 7 can be further profiled by a surface profile to provide a seating 11 in which the adhesive is received. The adhesive may also be applied in the bore 4.

The journal 1 can then be adjusted, in either embodiment, by applying a tool such as an Allen-key when the screw 5 has an Allen-type recess 13 as shown in FIG. 4. If the support 3 is eccentric, such adjustment provides for bodily shifting of the bearing 2 for adjustment purposes, to take up slack such as in a slide system 14 like that shown in FIG. 6 in which the bearing is situated.

The support 3 may have a extension 3a for passing through a hole in the machine plate 12.

If the support 3 is concentric, the vertical position can be adjusted when the journal 1 is rotated as before.

Figure 7:
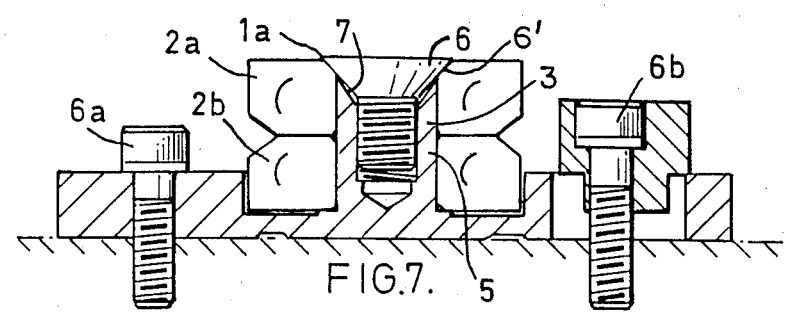
FIG. 7 is an enlarged transverse sectional view of a mounting for a bearing according to the invention.

As shown in FIG. 7 the angle of the rebate 7 of the support 3 and the angle of the underside of the head 6 of the screw 5, which are therefore both inclined, can be different so providing for avoidance of bottoming out of the screw head 6 on the inclined face of the rebate 7, which seeks to obviate metal-to-metal binding. This also provides for extra length, which gives maximum support for the bearing as the screw head bears down on a chamfered part 6' thereof, and clearance for this screw head 6 which does not bottom out on the support 3.

The journal can also be adjusted by turning the nut 10.

The journal 1 described herein with reference to the drawings thus provides a method of assembly of a bearing 2 utilising ball races 8 and 9 which bearing is adjustable and has a flush bearing surface.

Figure 6:
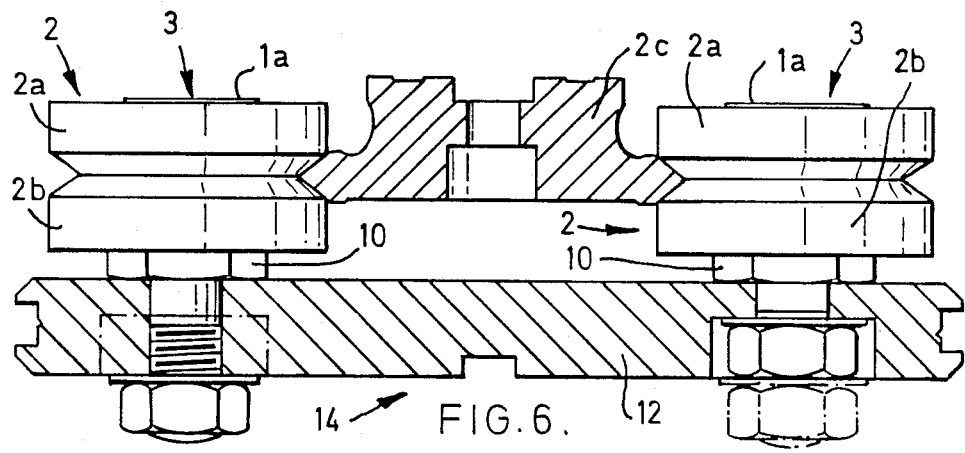
FIG. 6 is, to an enlarged scale, a transverse sectional view through part of a slide system according to the invention.

In the system 14 of FIG. 6, there are two bearings 2 having 70° V-grooves in which V-profiled edges of the slide 2c of the system 14, the V-edges being complementary to the grooves defined by wheels 2a, 2b, are received. The supports 3 for the different bearings can be of different lengths, for mounting the bearings on respectively thicker or thinner machine or carriage plate 12, which plate may have a recess to accommodate a shorter support 3, which support is on the underside (as viewed) of the plate in FIG. 6, that is, remote from the slide 2c. The supports thus form adjustable axles for the bearings 2.

Where the screws are concentric and eccentric, means of identifying same may be provided, for example the concentric screws 6a may be forged and the eccentric screws 6b may be plated (FIG. 7).

I claim:

1. A journal for a bearing, comprising:
   (i) a support for the bearing,
   (ii) said journal having a blind bore,
   (iii) said blind bore having a rebate therein, and
   (iv) means adapted to be accommodated in the rebate and adapted to connect the bearing and support whereby there is a substantially flush surface across the support and connecting means.

2. A journal as defined in claim 1, wherein the support and connecting means have a frusto-conical configuration.

3. A journal as defined in claim 2, wherein the connection means is eccentrically mounted.

4. A bearing, wherein there is a journal therefor as defined in claim 1.

5. A slide system, wherein thre is a bearing as defined in claim 4.

6. A journal as defined in claim 1, wherein the connecting means comprises a screw.

7. A journal as defined in claim 1, wherein the support is longer than the depth of the bearing.

8. A journal as defined in claim 1, wherein there is means adapted to bind the support and connecting means together.

9. A journal as defined in claim 1, wherein there is means adapted to bind the support and connecting means together, and wherein said binding means comprises an adhesive compound.

10. A journal as defined in claim 9, wherein there is a surface profile in the rebate in which the binding means is received.

11. A journal as defined in claim 9, wherein there is a profile in said rebate comprising a continuous groove in which said receiving means is received.

12. A journal as defined in claim 1, wherein the rebate of the support and the connecting means are of complementary shape.

13. A journal as defined in claim 1, wherein the rebate and a head of the connecting means have respective angles of inclination, which angles are unequal.

* * * * *